(12) United States Patent
Rassinger

(10) Patent No.: US 7,479,219 B2
(45) Date of Patent: Jan. 20, 2009

(54) FILTER DEVICE FOR FLUIDS AND METHOD FOR FILTERING FLUIDS

(76) Inventor: Guenther Rassinger, Auengasse 26, A-9170 Ferlach (AT)

( * ) Notice: Subject to any disclaimer, the term of this patent is extended or adjusted under 35 U.S.C. 154(b) by 344 days.

(21) Appl. No.: 10/912,021

(22) Filed: Aug. 5, 2004

(65) Prior Publication Data
US 2006/0027510 A1 Feb. 9, 2006

(51) Int. Cl.
*B01D 35/147* (2006.01)
(52) U.S. Cl. .................... 210/130; 210/136; 210/338
(58) Field of Classification Search .............. None
See application file for complete search history.

(56) References Cited

U.S. PATENT DOCUMENTS

| | | | | | |
|---|---|---|---|---|---|
| 547,923 | A | * | 10/1895 | Isbell | 210/301 |
| 1,893,330 | A | * | 1/1933 | Jones | 428/566 |
| 2,103,434 | A | * | 12/1937 | Pennebaker | 210/185 |
| 2,356,334 | A | * | 8/1944 | Maude et al. | 422/146 |
| 2,432,475 | A | * | 12/1947 | Griffith | 210/183 |
| 2,651,414 | A | * | 9/1953 | Archibald | 210/307 |
| 2,673,919 | A | * | 3/1954 | Arvins et al. | 392/495 |
| 2,750,042 | A | * | 6/1956 | Wilkinson | 210/130 |
| 2,770,368 | A | * | 11/1956 | Tischer | 210/132 |
| 3,000,505 | A | | 9/1961 | Scavuzzo | |
| 3,211,292 | A | * | 10/1965 | Bull | 210/342 |
| 3,283,902 | A | * | 11/1966 | Silverwater et al. | 210/90 |
| 3,331,509 | A | * | 7/1967 | Gray, Jr. | 210/90 |
| 3,370,708 | A | * | 2/1968 | Hultgren et al. | 210/130 |
| 3,467,256 | A | * | 9/1969 | Humbert, Jr. et al. | 210/132 |
| 3,482,699 | A | * | 12/1969 | Angle et al. | 210/184 |
| 3,582,613 | A | * | 6/1971 | Pies | 392/491 |
| 3,734,293 | A | * | 5/1973 | Biskis | 210/185 |
| 3,887,467 | A | * | 6/1975 | Johnson | 210/186 |
| 3,988,244 | A | * | 10/1976 | Brooks | 210/317 |
| 4,066,550 | A | * | 1/1978 | Beaumont | 210/183 |
| 4,317,727 | A | * | 3/1982 | Meissner | 210/315 |
| 4,537,681 | A | * | 8/1985 | Argiropoulos et al. | 210/317 |
| 4,831,980 | A | * | 5/1989 | Nasu et al. | 123/196 A |
| 5,476,139 | A | * | 12/1995 | Gire | 165/119 |
| 5,520,801 | A | * | 5/1996 | Gerber et al. | 210/130 |
| 5,702,602 | A | * | 12/1997 | Brown et al. | 210/342 |

(Continued)

FOREIGN PATENT DOCUMENTS

DE 42 21 897 A1 1/1994

(Continued)

OTHER PUBLICATIONS

Some definitions of "cascade" downloaded from www.Dictionary.com on Aug. 22, 2007—two pages.*

*Primary Examiner*—Robert James Popovics

(57) ABSTRACT

A filter device 10 for fluids, especially for motor oil, hydraulic oil, has a filter case 1 comprising one or two filter inlets 2 and one filter outlet 3. The filter case contains one filter 4 consisting of at least two ring-shaped filter elements 7, 8 which concentrically enclose a central tube 18 of the filter device. In a channel 14 between the two adjacent filter elements there is a duct 16 which is run in the form of a spiral around inner filter element 8 and is embedded in filter 4. In duct 16 there is a pressure-controlled regulating valve 9 which opens when a certain level of pressure is exceeded in the filtered oil.

19 Claims, 5 Drawing Sheets

U.S. PATENT DOCUMENTS

| | | | |
|---|---|---|---|
| 5,967,111 A * | 10/1999 | Hedman | 123/196 A |
| 6,199,542 B1 * | 3/2001 | McKay | 123/557 |
| 6,261,448 B1 * | 7/2001 | Merchant et al. | 210/184 |
| 6,872,304 B1 * | 3/2005 | Gebert | 210/232 |
| 6,881,330 B2 * | 4/2005 | Doyle et al. | 210/132 |
| 6,939,464 B1 * | 9/2005 | Jiang et al. | 210/232 |
| 6,994,784 B2 * | 2/2006 | Jainek | 210/149 |
| 7,297,282 B2 * | 11/2007 | Suzumori et al. | 210/767 |
| 7,396,473 B1 * | 7/2008 | Guynn | 210/774 |
| 2003/0080036 A1 * | 5/2003 | Nguyen | 210/185 |
| 2003/0121840 A1 * | 7/2003 | Pex et al. | 210/185 |
| 2003/0178351 A1 | 9/2003 | Michael et al. | |
| 2004/0149636 A1 | 8/2004 | Backes et al. | |
| 2006/0027510 A1 * | 2/2006 | Rassinger | 210/790 |

FOREIGN PATENT DOCUMENTS

| | | |
|---|---|---|
| DE | 196 44 647 A1 | 4/1998 |
| EP | 0 729 775 A | 9/1996 |
| FR | 1574913 A | 7/1966 |
| FR | 1574913 | 7/1969 |
| GB | 1023178 | 3/1966 |
| GB | 1023178 A | 3/1966 |
| KR | 1998053864 | 10/1998 |

* cited by examiner

FILTER DEVICE FOR FLUIDS AND METHOD FOR FILTERING FLUIDS

BACKGROUND OF THE INVENTION

1. Field of the Invention

The invention relates to a filter device for fluids, including a filter case containing at least one filter inlet and one filter outlet and one filter arranged in between. The device includes a duct for by-passing a portion of the filter, and a valve for by-passing the entire filter. The invention also relates to a method for filtering fluids through a filter, including the steps of introducing a fluid, filtering the fluid until the pressure across the filter reaches a first limit, by-passing a portion of the filter while continuing filtering the fluid, and by-passing the filter entirely when the pressure across the filter reaches a second limit. The first and second limit may be the same or different.

2. Prior Art

Particles of various sizes and consistency which collect in liquid and gas media used for lubricating and/or cooling moving machine parts as a result of wear, corrosion, contamination and related condensates and emulsions, must be filtered out of the media to prevent damage to machines. Particles such as these cause damage to engines, pumps, controls, regulators, so that such systems age more quickly due to mechanical wear and corrosion. Even liquid media such as motor oil, transmission oil, hydraulic oil, transformer oil, petroleum and synthetic oils and mixtures, mineral oils, partially and completely biological oils or their mixtures, and completely synthetic oils cause wear due to such particles and become contaminated more quickly. If the particles and contaminants are not filtered out, the systems can experience clogging or adhesive lock since the liquid media, such as the diverse oils specified above, can thicken due to accumulation of particles and/or the formation of an emulsion, i.e. its viscosity increases and, hence, a high degree of friction is created in lubricating slots, along crankshafts and at other moving machine parts. If soft particles as large as approx. 30 μm are pulverized, the number of particles, i.e. the particle density, increases, resulting in the pulverized particles severely lowering the air release property of the oils, which in turn results in an acceleration of the oxidative corrosion and cavitation of the machine parts due to the oxygen contained in the oil. Hence, for example, if the lubricating slot in a piston engine is not completely wetted or filled with oil, elliptic bulges are created which reduce engine performance and engine efficiency and lead to increased fuel and oil consumption as well as to increased exhaust emissions. Pumps in the hydraulic system are subject to the same negative effects as engines. In the case of slide-valve controls which regulate the feed rate, particles and contaminants can cause a rounding of the slide-valve rods, i.e. the result is what is known as a control deviation. The slide volume control then reacts less precisely and less sensitively.

The filter device in the circulatory system of the filtered liquid or gas media filters the particles, contaminants and water out of the media.

Because of the large discrepancy between the temperature in the engine's crankcase, roughly 260 to 280° C., and the ambient temperature, approximately 20° C., water vapor condenses out of the ambient air and enters the engine oil, in this manner. Water can also enter the motor oil if the cylinder head seals leak or burst. When the engine cools down, water collects in the oil pan and gets into the filter device when the engine is cold-started. The known filters generally only have a negligible water capacity; as they absorb water their materials quickly swell and are filled to capacity. The filter service life of known filters is approximately 500 hours. The service life of the media to be filtered, especially the oil service life, is also reduced by the short service life of the filters—if they are not changed at the same time as the filters.

DE 42 21 897 A1 discloses a filter device featuring one coarse filter and one fine filter, connected in parallel, for liquid or gas media, especially for hydraulic oil. A flow regulating valve, connected upstream from the fine filter, limits the volumetric flow of the liquid or gas medium through the fine filter to a preset value. The coarse filter is equipped with a bypass valve. One part of the volumetric flow of the filtered medium is fed directly through the coarse filter, while another part of the volumetric flow is fed through the flow regulation valve and then through the fine filter. The volumetric flows filtered in the coarse and fine filters are subsequently joined together at one duct outlet. Regulating the volumetric flow to a preset value protects the fine filter from pressure peaks in the medium. If the coarse filter is characterized by a high degree of contamination and if, due to this, it becomes impenetrable to the filtered medium, or if the medium to be filtered has a high degree of viscosity, such as cold hydraulic oil, so that it cannot pass through the coarse filter and the fine filter, the volumetric flow is fed unfiltered through the bypass valve. This avoids any restriction or interruption in the circulation of the volumetric flow of the filtered medium.

In DE 196 44 647 A1 a filter for fluids is described featuring a substantially pot-shaped case in which a filter insert is arranged consisting of a filter element folded in a zigzag shape and face end discs. The filter case has a fastening flange and a lid which is connected by means of a screw or bayonet connection to the fastening flange. A single replaceable filter insert is arranged in the filter case.

SUMMARY OF THE INVENTION

The object of the invention is to make available a filter device and a method for filtering fluids, especially motor and hydraulic oils, which completely permits exploiting the storage capacity of the filter inserted into the filter device to hold water, particles and unwanted contaminants which greatly extends the service life of the filter.

This object is achieved by a filter device of the type described at the beginning in such a manner that the filter is formed at least in a two-part design and has a duct, embedded in the filter, provided with a pressure-controlled regulating valve and that the duct, bypasses in terms of flow, at least one portion of the filter.

In another embodiment of the invention, a filter consists of two or more ring-shaped filter elements, arranged concentrically one inside the other, or of two or more cascade-shaped filter elements arranged adjacent to each other, whereby the duct in either case is embedded between two adjacent filter elements.

In a further embodiment of the invention the filter is arranged concentrically around a central tube of the filter device and consists of at least one inner and at least one outer filter element. The duct in this case is run in the form of a spiral at least around the inner filter element. The duct has a diameter in the range of greater than/equal to 0.1 mm, preferably 0.1 to 10 mm, and has openings distributed across its peripheral area. The duct consists preferably of the same material as the filter. The duct can equally be made of a plastic or metal tube. Furthermore, it is possible to manufacture the duct of a tube made of pulp, cellulose or fiber material. In another embodiment the duct is formed inside the filter between two filter elements. This is done by wrapping a coiled wire around the smaller, ring-shaped filter element during manufacture, sliding the adjacent, larger ring-shaped filter element over it, and pressing it at a given pressure against the smaller filter element so that the contours of the coiled wire are impressed into the filter elements. Then the two filter elements are separated, the coiled wire is removed, and finally all the filter elements are recombined to form the whole filter.

In an improvement of the filter device, one or more pressure-controlled regulating valves are arranged in the duct. Suitably there is a sieve positioned upstream from one, several or every regulating valve. The screen works as a fine sieve and only lets through particles and contaminants that are smaller than the specified mesh aperture of the sieve or sieves.

Within the scope of the above object, a method for filtering fluids is also provided in which the fluids in a filter device are fed through at least a two-part filter to a filter outlet. Because of the gradual clogging of the filter with particles and contaminants, the pressure in the fluids rises to a value at which a by-pass valve is opened in a duct, that is partially by-passing one part of the filter and is embedded in the filter, and the fluids are fed through the duct into and through the still penetrable part of the filter to the filter outlet.

In the embodiment of the method, the liquids being filtered are fed through an outer filter element of the filter in the direction of one or several inner filter elements, and after passing through them, flow through the innermost filter element and a tube having openings into the filter outlet, until the outer filter element becomes impenetrable due to clogging with particles and contaminants.

In an improvement of the method, particles, contaminants and water are filtered out of liquids from the group:

hydraulic, motor, transmission, and transformer oils, petroleum and synthetic oils or their mixtures, mineral oils, partially and completely synthetic oils, partially or completely biological oils, and mixtures of various oils, the fluids possibly containing additives such as lubricants, corrosion inhibitors, wetting agents, and similar additives, and particles and contaminants are filtered out of fluids such as water, organic fluids, acids, alkaline solutions, sewage.

The invention achieves advantages associated with the fact that the filter capacity for particles and contaminants is extensively exploited, including in particular the filter's capacity to absorb water, which results in the inventive filter device having a filter service life which, in comparison with filter assemblies containing identically large filters, for motor oils, are longer by at least a factor of greater than 1, preferably 2-3 times or larger, and for hydraulic oils, at least by a factor of greater than 1, preferably 2-3 times, or as great as 10 times. Correspondingly, the oil service life is also lengthened by the same or greater factors of the filter life. This enables motors, hydraulic systems and other machines lubricated with oils to be operated longer without filter and oil change. A major cost saving is thus achieved since neither the filter nor the oil must be changed as frequently which, in turn, permits longer working time.

BRIEF DESCRIPTION OF THE DRAWINGS

The invention is explained in greater detail by means of embodiments illustrated in the drawings.

DETAILED DESCRIPTION OF THE PREFERRED EMBODIMENTS

Figure 1:
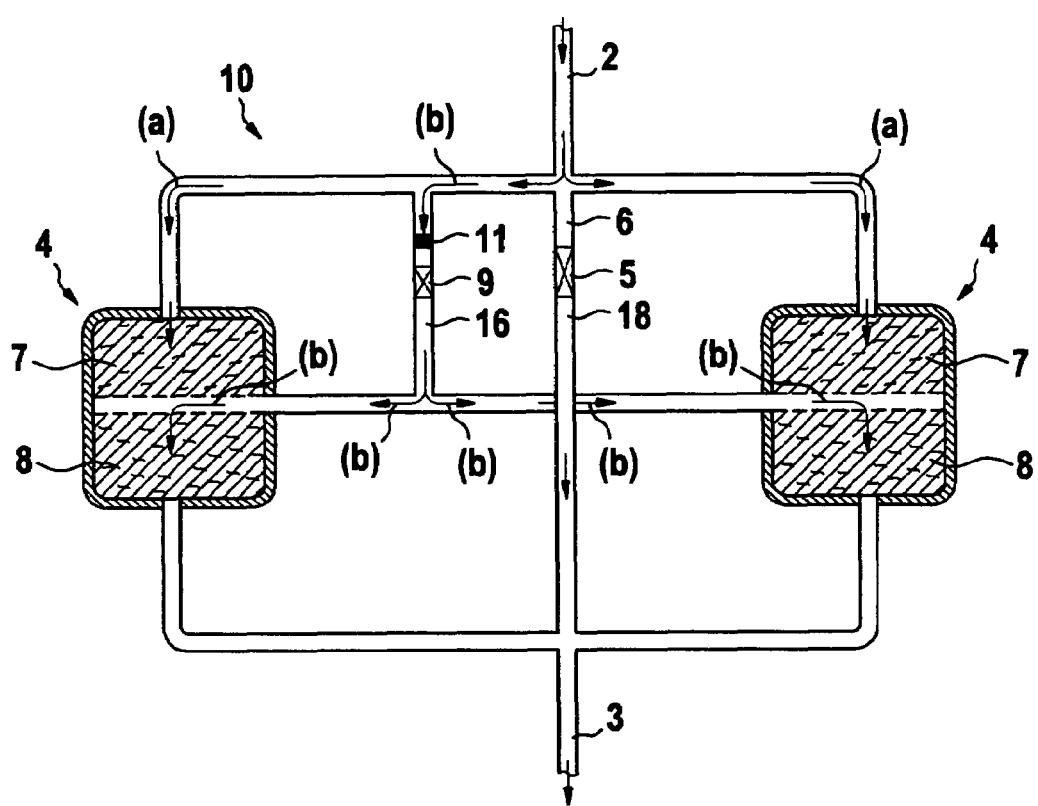
FIG. 1 is a cross-sectional schematic flow path of the fluids being filtered through a first or second embodiment of a filter device according to the invention.

A filter device 10, shown schematically in cross-section in FIG. 1, is arranged in a closed circulation system which involves motor oil, hydraulic oil, other oil or other fluid, for an excavator, for example. Filter device 10 includes a filter inlet 2, a filter outlet 3 and an intermediary filter 4, consisting of an outer filter element 7 and an inner filter element 8. The filter elements 7, 8 are designed in a ring shape and arranged concentrically around a central tube 18 of a filter device 10. The intermediary filter 4 is schematically split up in two parts, each having the reference numeral 4, for better understanding the function of the filter device 10 as described thereafter. It is to imagine that one part is arranged left from the tube 18 and the other part of filter 4 is right from tube 18. A duct 16, in which a sieve 11 is positioned upstream from a pressure-controlled regulating valve 9, by-passes one part of filter 4, specifically the outer filter element 7, and runs between the outer and the inner filter element. Inner filter element 8 is connected to central tube 18, that is connected to filter outlet 3. In a by-pass path 6, which is positioned upstream from the central tube 18, there is a pressure-controlled by-pass valve 5. The oil flowing through filter inlet 2 separates into two volumetric flows and flows in the direction of the arrows (a) through outer filter element 7 and inner filter element 8, to filter outlet 3. In this first phase of the filter process, valves 5 and 9 are closed. In time, outer filter element 7 of filter 4 is gradually clogged by larger particles and contaminants present in the oil so that any water in the oil can no longer be absorbed and, moreover, the pressure in the oil increases. Just before outer filter element 7 is completely clogged, the rise in oil pressure is sufficient to open the regulating valve 9 in duct 16. Then the in-flowing oil flows in the direction of the arrows (b) through regulating valve 9, duct 16, inner filter element 8 to filter outlet 3. At this point inner filter element 8 is only partially clogged by smaller particles and contaminants, if at all. Because of the small dimensions of duct 16, the volumetric flow rate through duct 16 and inner filter element 8 is low, so that the oil pressure rapidly rises to a value at which by-pass valve 5 in by-pass path 6 opens, and a larger volumetric flow is fed from filter inlet 2 through central tube 18, unfiltered, to filter outlet 3.

Without the by-pass of outer filter elements 7 through regulating valve 9 and duct 16, filter 4 would no longer be able to filter the in-flowing oil at the end of the first phase of the filter process, since the clogged outer filter element 7 would block any further oil flow-through. Then filter 4 would have to be changed although inner filter element 8 would not be clogged yet.

When the regulating valve 9 opens, the second phase of the filter process starts. In the second phase, among other things, inner filter element 8 swells due to water absorption and finally presses outer filter element 7 against the filter case of filter device 10, which releases larger particles and contaminants out of outer filter element 7, permitting it to store water again and restoring its permeability for the filtered oil, so that particles are filtered out, contributing to a longer filter service life. The second phase continues until inner filter element 8 is clogged with particles and contaminants.

Figure 2:
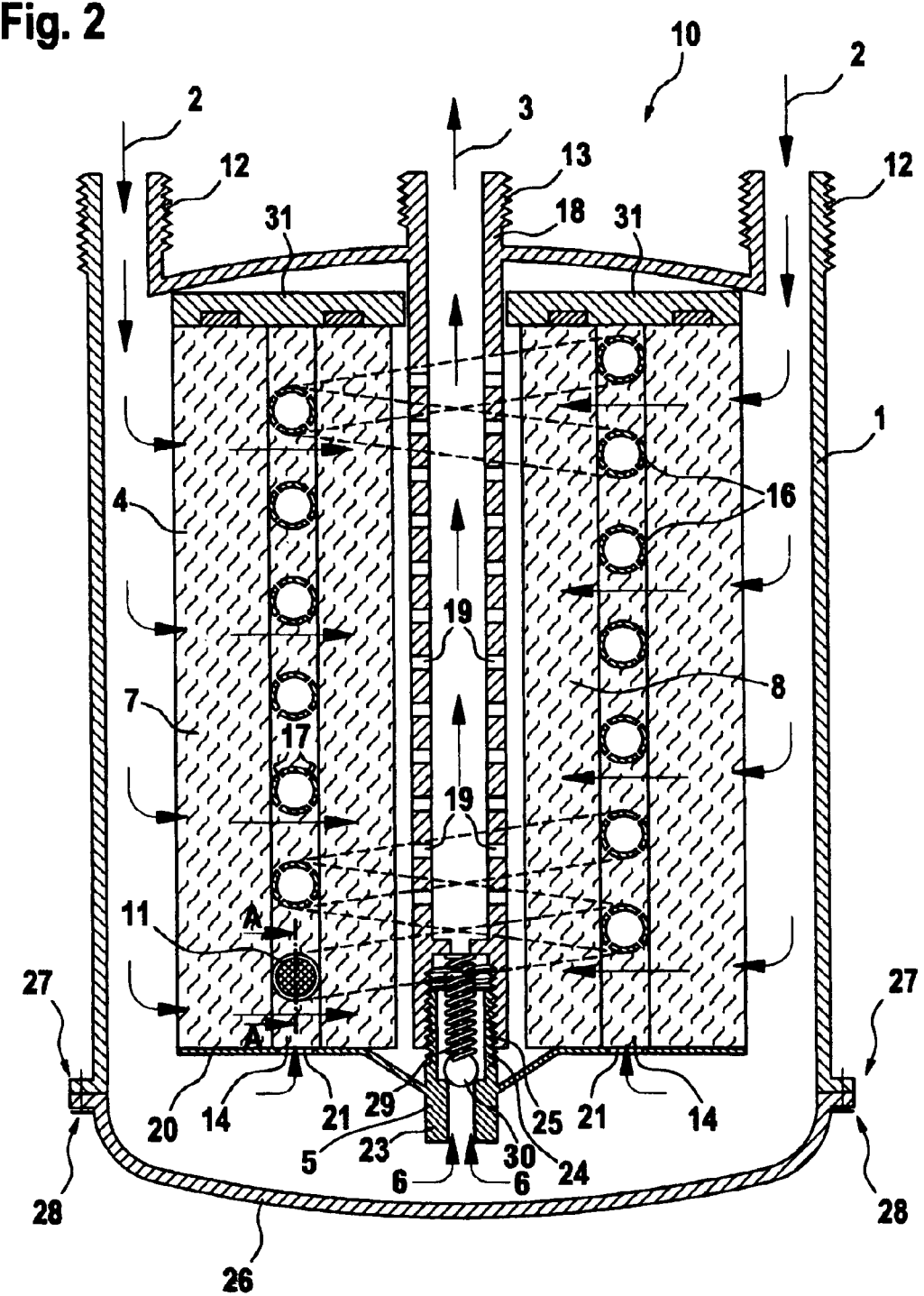
FIG. 2 is a sectional view of a first embodiment of the filter device according to the invention.

As soon as this occurs, it is recommended to replace the clogged filter 4 with a fresh filter. FIG. 2 illustrates a sectional view of a first embodiment of filter device 10 which for example is connected to a hydraulic circulatory system of an excavator, the oil system of a motor, or the lubricating circuit of a machine. A pot-type filter case 1 of filter device 10 comprises at one end one or two filter inlets 2 and one filter outlet 3. If two filter inlets 2 exist, they are symmetrically arranged in relation to the middle axis of filter device 10. Filter outlet 3 is arranged in the middle. At the opposite end, a case lid 26 locks filter case 1 and is connected via a flanged joint 27 and screws 28 to the other part of the filter case. Filter 4 is replaced by unscrewing screws 28 of flanged joint 27 and raising case lid 26 so that the filter is accessible. After releasing base plate 20, by unscrewing cylinder part 23, the filter 4 can be taken off central tube 18 and replaced by a fresh filter. Central tube 18 comprises in its shell surface openings 19, and filter outlet 3 is an integral part of central tube 18. Central tube 18 has at its end opposite to filter outlet 3 an internal thread 25, into which the external thread 24 of cylinder part 23 is screwed. The cylinder part 23 holds a by-pass valve 5 that acts as a by-pass valve for the volumetric flow of the fluid being filtered, if filter 4 is impenetrable to the fluid due to particles, contaminants and water.

Filter 4 has a two-part design and consists of one outer and one inner ring-shaped filter element 7 and 8. These two filter elements are arranged concentrically around central tube 18. Filter 4 is stably mounted with the help of washer 31 on the outlet side end, and the base plate 20 at the opposite end away from the filter outlet 3 within the filter case 1. In the base plate 20 there is an inlet opening 21 to a ring-shaped channel 14 arranged between filter elements 7 and 8. In channel 14 a duct 16 runs in a spiral configuration around inner filter element 8. The diameter of the duct is equal to/larger than 0.1 mm and is specifically in the range of 0.1 to 10 mm. Duct 16 contains a pressure-controlled regulating valve 9 (see FIG. 4), and is embedded in filter 4. Openings 17 are distributed over the peripheral area of duct 16.

Figure 4:
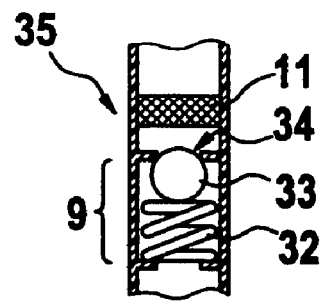
FIG. 4 is in detail the partially broken, sectioned view along the line A-A in FIG. 2 of a regulating valve of the filter device.

As can be seen from FIG. 4, the regulating valve 9 consists of a compression spring 32 and a ball 33, which keeps the discharge opening 34 closed until a pre-set pressure of the fluid being filtered is reached. As soon as the pressure in the fluid rises above the pre-set value, the ball 33 opens the discharge opening 34 against the pressure of the compression spring so that the fluid can flow into the duct 16. The pressure-controlled regulating valve 9 has a sieve 11 positioned up-stream which is designed as a fine filter and only permits particles smaller than the mesh aperture of the sieve to enter duct 16.

Duct 16 consists especially of a metal or plastic tube. The duct can also be made of pulp, cellulose, or fiber material. Duct 16 is preferably made from the same material as filter 4. Duct 16 by-passes, in terms of the flow path, a part of filter 4, specifically outer filter element 7.

By-pass path 6 from filter inlet 2 via by-pass valve 5 to central tube 18 completely by-passes filter 4. By-pass valve 5 is ball-spring type where spring 29 biases the ball 30 to block path 6.

Each filter inlet 2 has an external thread 12, also the filter outlet 3 arranged in the middle of the filter case 1 has an external thread 13. The filter device 10 is screwed to a base structure of an oil/water heat exchanger or to respective ducts of an oil or hydraulic circulation system by means of the external threads 12 and 13.

Figure 3:
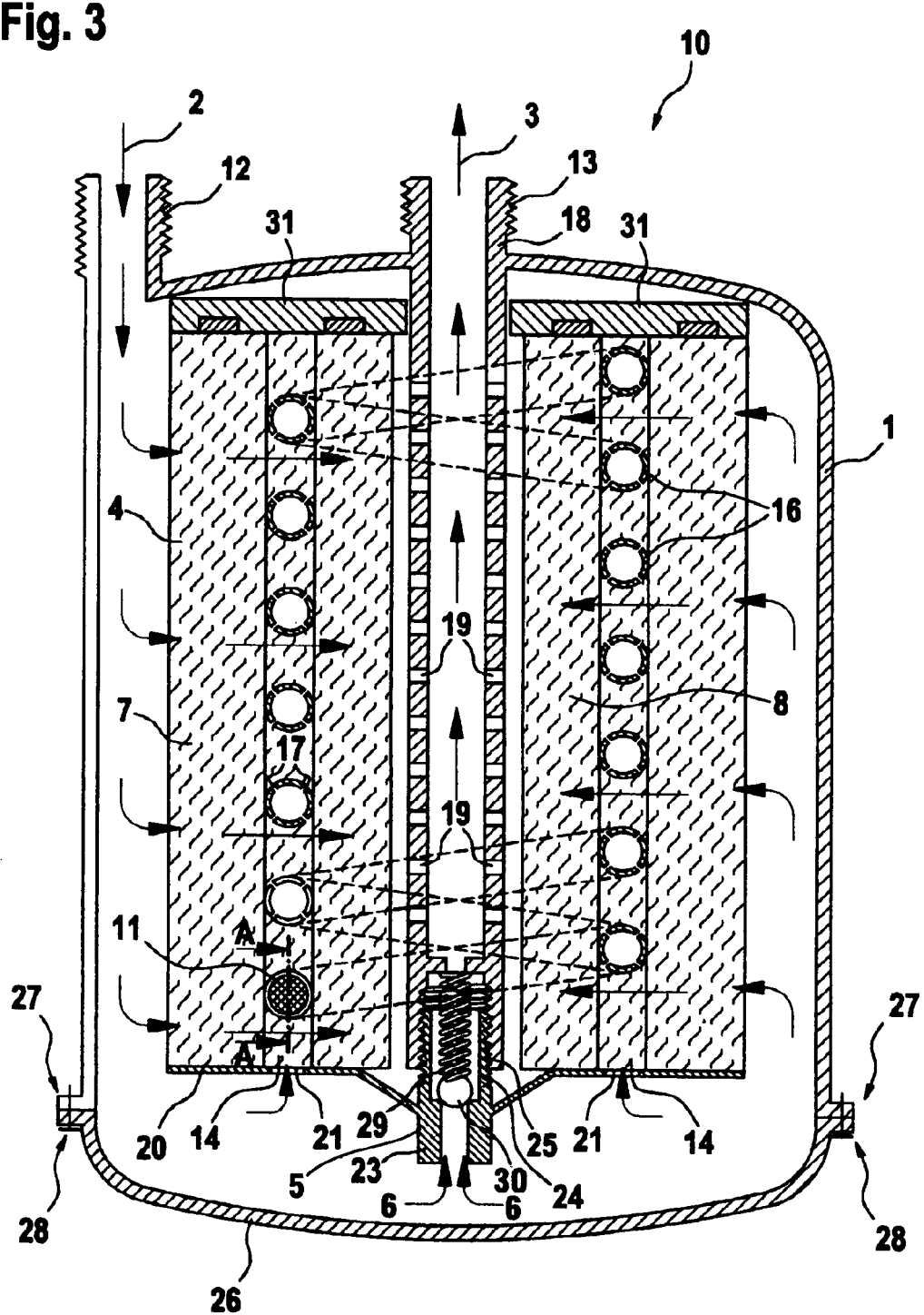
FIG. 3 is a sectional view of a second embodiment of the filter device according to the invention.

FIG. 3 shows a sectional view through a second embodiment of the filter device 10, in which the same components are labeled with the same reference numbers as in the embodiment in FIG. 2 and are not described again. The basic difference between the second and the first embodiment in FIG. 2 is the fact that there is only one filter inlet 2 and that duct 16 is formed within filter 4 between the outer and inner filter elements 7, 8. This means that for duct 16 no tube is provided for, but instead the spiral-shaped duct is formed directly in the filter material. As already described above, this can be achieved for example by wrapping a coil wire in a spiral path around the ring-shaped inner filter element 8 and then sliding the outer ring-shaped filter element 7 over the inner ring-shaped filter element 8 and pressing it against the latter. Thereby the contours of the wire are impressed in the filter material. Afterwards, the two filter elements are separated, the coil wire removed, and filter elements 7 and 8 are put together again. When the duct 16 is formed like this, a cylindrical sieve/valve configuration 35, shown sectioned schematically in FIG. 4, is subsequently inserted in press fit or glued into the duct 16. Regarding compression springs 32, 29 of valves 9 and 5 it should be noted that the spring tensions or spring characteristic curves differ only slightly from each other, the spring tension of compression spring 32 being designed slightly smaller than the spring tension of spring 29. It-is also possible to design the spring tensions of the two compression springs to be approximately equal.

The filtered fluids can be hydraulic, motor, transmission, transformer oils, and also petroleum or synthetic oils, or their mixtures, partially and completely synthetic oils, mineral oils, partially and completely biological oils and a mixed variety of oils, the fluids if necessary are mixed with additives such as lubricants, corrosion inhibitor, wetting agent, and similar substances. Equally, fluids such as water, organic fluids, acids, alkaline solutions and sewage can be filtered.

Since the oils being filtered generally always contain water, the description of the invention refers in each case to fluids to be filtered, when oils are described or meant.

In the first phase of filtration, the fluids being filtered are fed through the outer, ring-shaped filter element 7 of filter 4 in the direction of the inner ring-shaped filter element 8. In the process, the fluids pass through outer filter element 7, the channel 14, and arrive at inner filter element 8. Emerging from there, they then flow through the openings 19 into central tube 18 and exit the filter device 10 through the filter outlet 3. In the first phase valves 5 and 9 are closed. As the fluids pass through filter 4, the larger particles and contaminants are filtered out first, outer filter element 7 gradually becoming clogged and impenetrable for the fluids. The gradual clogging of outer filter element 7 causes the pressure of the fluids to rise to a value at which the by-pass valve 9 opens and gives access to the duct 16 embedded in filter 4. The relatively small volumetric flow of fluids entering duct 16 exits through the openings 17 of duct 16 and passes through inner filter element 8 to enter central tube 18, known as a permeator tube. In the second embodiment of the filter device 10, in which duct 16 is formed directly by the filter material, the fluids are fed immediately and directly through outer filter element 7 to inner filter element 8, until the outer filter element 7 is clogged. Then duct 16 opens and the small volumetric flow flows through duct 16 and inner filter element 8 to tube 18.

After outer filter element 7 is clogged with particles and contaminants, the pressure-controlled by-pass valve 5 opens at the same time or shortly after the opening of regulating valve 9, so that the fluids can be fed unfiltered through filter inlet(s) 2, by-pass path 6, by-pass valve 5 and central tube 18 to filter outlet 3 in a larger volumetric flow than through duct 16. The particles and contaminants filtered out of the fluids generally have diameters of 10 to 50 μm.

Figure 5:
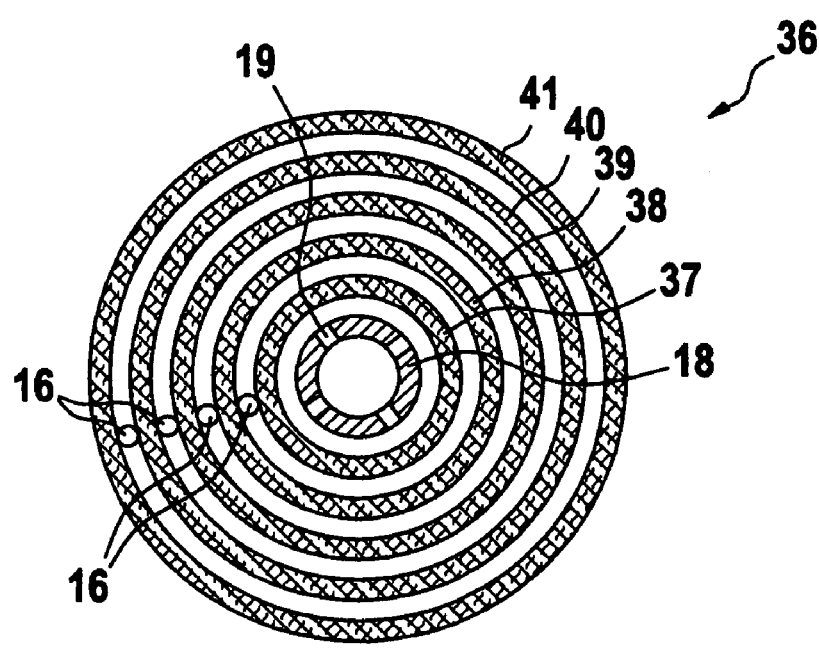
FIG. 5 is a plan sectional view of a filter device with ring-shaped filter elements.

Of course, another embodiment of a filter 36, shown in FIG. 5, can also be designed to comprise several parts, i.e. comprising three or more ring-shaped filter elements 37, 38, . . . 41 which concentrically enclose the central tube 18. In each of the channels between two adjacent filter elements there are ducts 16, with regulating valves 9 which open simultaneously or shortly after each other, as soon as the outermost filter element 41 is clogged and the respective pressure rises above a pre-set value in the filtered fluids. FIG. 5 shows a schematic top plan view of such a filter 36.

Filter 36 includes several ring-shaped filter elements 37, 38, 39, . . . 41 concentrically arranged in each and surrounding tube 18. Between two adjacent filter elements 37, 38; 38, 39; 39, 40 and 40, 41 is a duct 16 in which one or several, not shown, pressure-controlled regulating valves 9 are arranged.

The spring tension of the respective compression spring is designed to be the same or different than the spring tension of the other springs. The regulating valve 9, attached at the beginning of duct 16, has a sieve 11 suitably positioned upstream from it. If there are several regulating valves in a duct 16, some of or every one of the regulating valves has a sieve suitably positioned upstream from it. The sieves 11 comprise identical or different mesh apertures. As soon as the outermost filter element 41 is clogged by particles and/or contaminants in the filtered fluids, one, several or all the regulating valves in ducts 16 open simultaneously or one after another, so that the fluids can flow through the inner filter elements 40, 39, 38, 37 to tube 18. The sequence of the process corresponds to the one described using the filter devices according to FIGS. 2 and 3 for the two-part filter 4.

Figure 6:
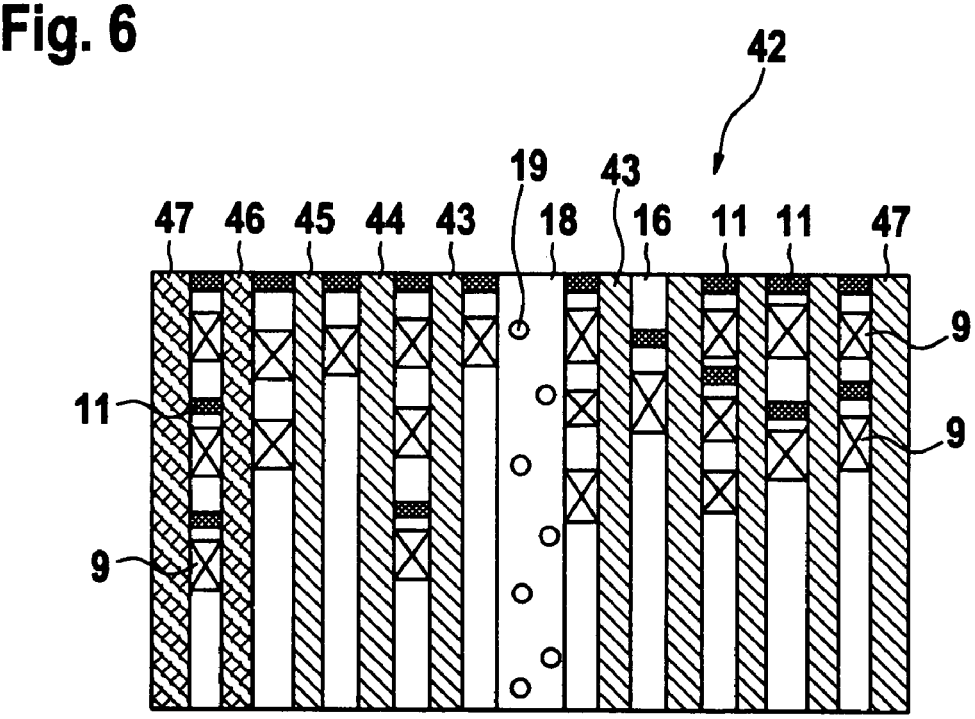
FIG. 6 is a side sectional view of a filter device with cascade arrangement filter elements.

FIG. 6 shows a side view of a filter 42 which consists of cascade arrangement of filter elements 43, 44, 45, . . . 47 arranged adjacent to each other, there being one duct 16 between every two adjacent filter elements 43, 44; 44, 45; 45, 46; and 46, 47. There are one or several pressure-controlled regulating valves 9, preferably corresponding to the regulating valve 9 shown in FIG. 4, positioned in each duct 16. At the beginning of the individual duct 16, a sieve 11 is preferably positioned upstream from regulating valve 9. Basically, sieves 11 are suitably positioned upstream of several or every regulating valve in a duct 16. If the outermost filter element 47 is clogged by particles and/or contaminants, one, several or all the regulating valves 9 in ducts 16 open at the same time or one after another, so that the fluids can flow through the inner filter elements 46, 45, 44, 43 to tube 18. The process sequence is the same as that for the two-part filter 4 described in FIGS. 2 and 3.

Figure 7:
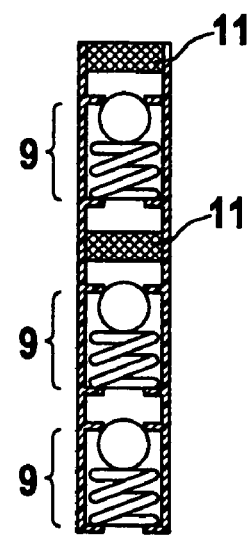
FIG. 7 is in detail a duct with several regulating valves and several sieves.

FIG. 7 shows one section of a duct 16 in which a sieve 11 has been positioned in each case upstream from each of the three regulating valves 9. Of course sieve 11 can also be positioned upstream from only one or two regulating valves.

Thus it is apparent that there has been provided, in accordance with the invention, a process that fully satisfied the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

The invention claimed is:

1. A filter device for fluids including a filter case (1), comprising at least one filter inlet (2) and one filter outlet (3) and an intermediately arranged filter (4), characterized in that said filter has at least two parts and has a duct (16), embedded in said filter (4), said duct (16) provided with a pressure-controlled regulating valve (9), and said duct (16) has openings (17) distributed over its peripheral area and by-passes at least one part of said filter (4).

2. The filter device according to claim 1, characterized in that said filter comprising two or more ring-shaped filter elements, concentrically arranged one inside the other, or comprising two or several, cascade-shaped filter elements, whereby said duct (16) is embedded between each two ring shaped filter elements or between each two cascade-shaped filter elements.

3. The filter device according to claim 2, characterized in that duct (16) is formed within the filter between two filter elements.

4. The filter device according to claim 1, characterized in that said filter (4) is arranged concentrically around a central tube (18) of the filter device and said filter (4) comprises at least one outer and at least one inner filter element (7, 8).

5. The filter device according to claim 4, characterized in that said duct (16) is spirally shaped around said inner filter element (8).

6. The filter device according to claim 4, characterized in that a by-pass valve (5) is positioned up-stream from said central tube (18), said end of the central tube (18) facing away from said by-pass valve is aligned with said filter outlet (3) and that a by-pass path (6) from the filter inlet (2) via the by-pass valve (5) to the central tube (18) completely by-passes the filter (4).

7. The filter device according to claim 4, characterized in that said central tube (18) is outfitted with a number of openings (19) evenly distributed over its peripheral area.

8. The filter device according to claim 1, characterized in that said duct (16) has a diameter equal to/larger than 0.1 mm, specifically 0.1 to 10 mm.

9. The filter device according to claim 1, characterized in that said duct (16) consists of the same material as said filter (4).

10. The filter device according to claim 1, characterized in that said duct (16) is made of a metal or plastic tube.

11. The filter device according to claim 1, characterized in that said duct (16) comprises a tube made of pulp, cellulose or fiber material.

12. The filter device according to claim 1, characterized in that one or more pressure-controlled regulating valves (9) are arranged in said duct (16).

13. The filter device according to claim 12, characterized in that a sieve (11) is positioned upstream from each of said regulating valves (9) in the duct (16).

14. The filter device according to claim 12, characterized in that each of said regulating valves (9) has a ball (33) subjected to the load of a compression spring (32).

15. The filter device according to claim 1, characterized in that said filter case (1) includes a case lid (26) which is connected via a flanged joint (27), secured by screws (28).

16. The filter device according to claim 1, characterized in that said filter (4) is stably mounted by means of washers (31) and a base plate (20).

17. The filter device according to claim 16, characterized in that said base plate (20) comprises a centrally positioned cylinder part (23) which has an external thread (24) that is screwed onto an internal thread (25) of said tube (18) and that said by-pass valve (5) is arranged in said cylinder part (23).

18. The filter device according to claim 16, characterized in that said base plate (20) comprises an inlet opening (21) to a ring-shaped channel (14) between the filter elements (7, 8) and that said duct (16) runs in the channel (14).

19. The filter device according to claim 1, characterized in that two filter inlets (2) are provided symmetrical to the axis of said filter case (1), that each filter inlet (2) comprises an external thread (12) and that said filter outlet (3), centered in respect to said filter case (1), comprises an external thread (13).

* * * * *